Patented May 15, 1951

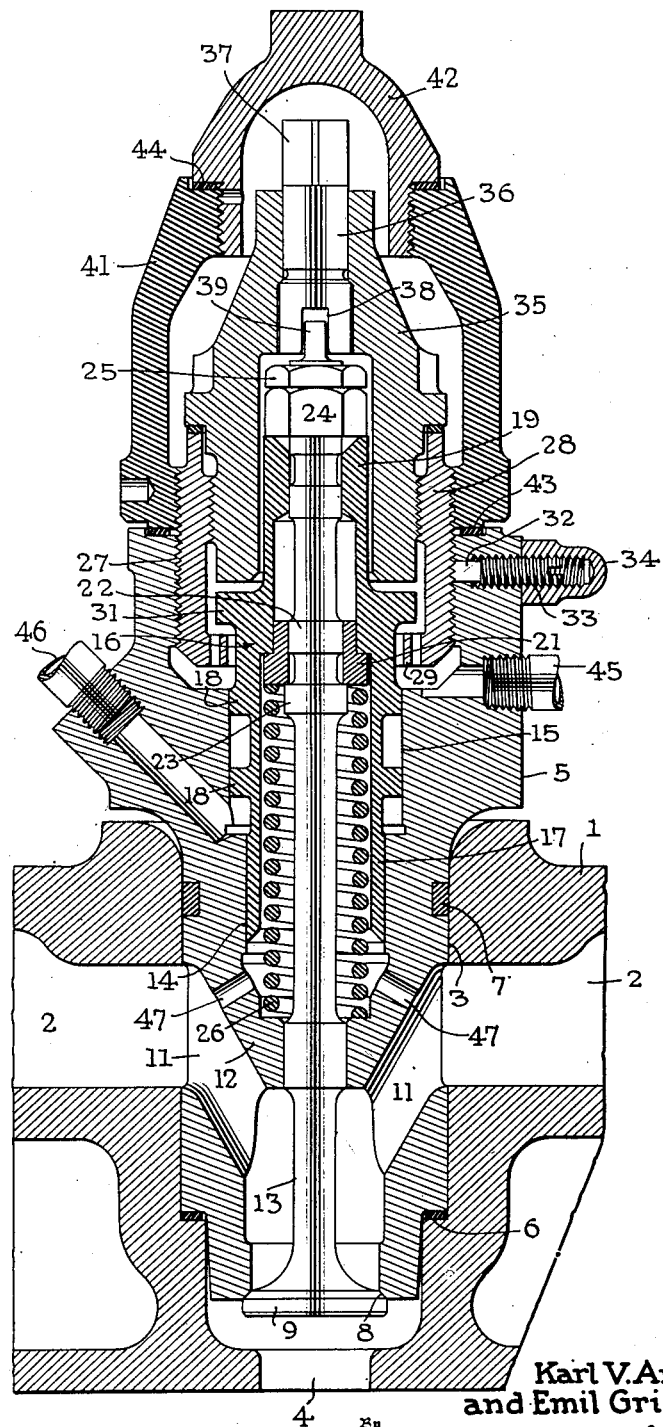

2,552,960

UNITED STATES PATENT OFFICE 2,552,960

GAS ACTUATED INLET VALVE

Emil Grieshaber and Karl V. Anderson, Milwaukee, Wis., assignors to Nordberg Manufacturing Company, Milwaukee, Wis., a corporation of Wisconsin Application September 27, 1946, Serial No. 699,698

3 Claims. (Cl. 123—92)

This invention relates to pressure operated fuel gas inlet valves for internal combustion engines.

In a copending application Serial No. 699,697, filed September 27, 1946, which issued July 6, 1948, as Patent No. 2,444,440, there is described and claimed an internal combustion engine in which fuel gas is admitted to each working space by a pressure operated valve. The pressure impulses are timed by a rotary distributor valve, and the pressure fluid is fuel gas at a pressure higher than that at which the fuel gas is supplied to the inlet valve.

The present application is directed to a fuel gas inlet valve particularly suited to such an engine.

The valve has several advantages. Since the fuel gas is commonly available at substantial pressures, say 100 p. s. i., it is economical to use it as a motive fluid. This is particularly true when, as is commonly the case, the fuel gas must be supplied to the inlet valve at a lower pressure. In such event the valve-actuating motor may conveniently be exhausted by the distributor valve to the fuel gas line leading to the fuel gas inlet valves. Since only fuel gas is used in the valve and its actuating motor there is no danger of forming explosive mixtures. If desired, a bleed connection may lead from the space between the valve and its actuating motor and so serve to collect leakage from both.

A valve embodying, in preferred form, the various features of the invention, is shown in longitudinal axial section in the accompanying drawing.

A portion of the cylinder casting appears at 1 and has a passage 2 through which fuel gas at an appropriate pressure (say 50 p. s. i.) is supplied. Communicating with passage 2 is a bore 3 to receive the valve housing. The bore 3 leads to port 4 which communicates with the combustion space of the cylinder.

The body 5 of the valve housing fits the bore 3 and seats on a shoulder 6, a gasket being interposed as shown. A packing ring 7 is used to produce a seal above port 2. The body 5 is held to the cylinder casting by studs of usual form not visible in the drawing.

At its lower end body 5 has a seat 8 for poppet valve 9 and, above ports 11 which communicate with passage 2, has a guide 12 for the stem 13 of the valve. Above and coaxial with guide 12 there are two concentric bores 14 and 15 in which works the tubular piston generally indicated by the numeral 16.

Piston 16 has a skirt portion 17 which surrounds and is spaced from stem 13 and works in bore 14. The piston includes two annular flanges 18 which work in bore 15 and a neck portion 19 which alone fits the upper end of stem 13. A shouldered bushing 21 is centered and sustained by collars 22, 23 on stem 13 and by a shoulder within piston 16. A nut 24 and check nut 25 lock stem 13, piston 16 and bushing 21 together as a rigid unit. A coil compression spring 26 reacts between body 5 above guide 12 and the lower face of bushing 21 and so urges valve 9 closed.

The upper end of body 5 is counterbored and threaded at 27 to receive the stop sleeve 28 which has an internal ported flange 29 which underlies the external flange 31 on piston 16. Flange 29 thus limits the opening movement of valve 9 and may be adjusted by turning sleeve 28. When the adjustment has been made the sleeve may be locked by clamp 32 set by screw 33. An acorn nut 34 is used to lock and also seal the screw 33 against leakage.

A double sealing cap structure is provided for the upper end of housing 5. An internal cap 35 is threaded into the stop sleeve 28 and seals against the upper margin thereof. It carries swiveled in its upper end a turning member 36 with wrench grip 37. This has a slot 38 at its lower end which straddles a cross-tongue 39 formed in the upper end of stem 13.

An external cap comprising a lower portion 41 and an upper portion 42 threaded together is threaded on the exterior of stop sleeve 28. A gasket 43 seals the lower portion 41 to body 5 and a gasket 44 seals the joint between portions 41 and 42.

The connection 45 is the impulse connection from the timing distributor (not shown) to the working space above piston 16.

Connection 46 is a connection for withdrawing fuel gas that may leak downward past the flanges 18 in piston 16 or upward past skirt 17 of the piston. It should be observed that ports 47 lead from ports 11 so that the transverse area of bore 14 is subject to the pressure in passages 2 (50 p. s. i.). If connection 46 leads to the fuel gas supply of the engine as is usually the case, the piston is subjected upward over its full effective area to the pressure in passage 2. The area of skirt 17 and bore 14 is approximately the effective area of valve 9 when closed.

Thus the valve is substantially indifferent to pressure in passage 2 and is biased closed by whatever pressure exists in connection 46 acting in the annular area of the lower flange 18, as well as by spring 26. The pressure admitted through connection 45 is effective on the transverse area of bore 15.

Pressure pulses controlled by the timing distributor of the engine are transmitted through connection 45 and react downward on piston 16, overpowering spring 26, and forcing valve 9 open. The valve is opened by each successive pulse and closes between pulses. Each pulse is discharged into the fuel delivery line and so reaches port 2.

The connection 46 receives any gas which may leak downward past piston 16 or upward past skirt 17 and delivers it to the fuel delivery line, which is at a lower pressure than the gas admitted through connection 45.

What is claimed is:

1. An inlet valve for engines of the type in which fuel gas under pressure is used as motive fluid in a pressure-actuated fuel gas admission valve, said valve comprising in combination, a housing enclosing a valve seat and a motor cylinder; a valve coacting with said seat and having a stem alined with the axis of said cylinder; a piston working in said cylinder and operatively related to said stem, said piston and cylinder enclosing a working space in which pressure reacts on the piston in a valve-opening direction, said piston having on the side remote from said working space a guiding sleeve which works in a guide formed in said housing; yielding means urging said valve closed; means forming a passage for supplying fuel gas to said valve seat to be controlled by said valve; a pressure connection leading to said working space; and a connection to a space within the housing between the piston and its guiding sleeve arranged to collect fuel gas leaking from said supply connection and working space.

2. The combination defined in claim 1 in which the housing comprises a body in which the cylinder and valve seat are formed, an annular piston stop for limiting the opening movement of the valve, said stop being in adjustable threaded engagement with the body, and a cap threaded upon the stop and seating upon the body to lock the stop in adjusted position and form a seal with the body.

3. The combination defined in claim 1 in which the piston and its guide sleeve take the form of a shouldered tubular sleeve which encircles the valve stem, is clamped thereto at the ends of said sleeve and valve stem both remote from the valve and is spaced from the stem at the end toward the valve, and the yielding means is a coil compression spring encircling the stem and extending within the spaced end of the piston-sleeve.

EMIL GRIESHABER.
KARL V. ANDERSON.

REFERENCES CITED

The following references are of record in the file of this patent:

UNITED STATES PATENTS

| Number | Name | Date |
|--------|------|------|
| 885,459 | Engler et al. | Apr. 21, 1908 |
| 1,696,984 | Trbojevich | Jan. 1, 1929 |
| 2,072,437 | Wurtele | Mar. 2, 1937 |
| 2,255,355 | Harris | Sept. 9, 1941 |
| 2,329,662 | Steiner | Sept. 14, 1943 |

FOREIGN PATENTS

| Number | Country | Date |
|--------|---------|------|
| 121,048 | Great Britain | Dec. 5, 1918 |